United States Patent [19]

Boyer

[11] 4,022,069
[45] May 10, 1977

[54] ROTARY ACTUATOR MECHANISM
[75] Inventor: Raymond W. Boyer, Dayton, Ohio
[73] Assignee: William R. Jacox, Dayton, Ohio
[22] Filed: July 28, 1975
[21] Appl. No.: 599,849

Related U.S. Application Data
[63] Continuation of Ser. No. 455,500, March 27, 1974, abandoned.

[52] U.S. Cl. .............................. 74/126; 335/228
[51] Int. Cl.² ....................................... F16H 27/02
[58] Field of Search ..................... 74/126; 335/228

[56] References Cited
UNITED STATES PATENTS
3,419,831  12/1968  Ganowsky .................... 335/228

Primary Examiner—Samuel Scott
Assistant Examiner—Wesley S. Ratliff, Jr.
Attorney, Agent, or Firm—Jacox & Meckstroth

[57] ABSTRACT

Rotary actuator mechanism in which relative axial movement of two magnetizable members is converted into relative rotative movement. Each magnetizable member has a plurality of inclined engagement surfaces, the inclined engagement surfaces of one magnetizable member are in an adjacent opposed position with respect to the inclined engagement surfaces of the other magnetizable member. Electromagnetic means are employed to provide the relative axial movement. An annular member retains a plurality of ball elements which are adapted to roll on opposed inclined surfaces. Relative rotative movement between the magnetizable members is created by action of the ball elements and the inclined engagement surfaces, with relative axial movement between the magnetizable members.

The degree of relative rotative movement of the actuator mechanism is adjustable by adjustably limiting the relative axial movement between the two members. The magnetizable members are arranged to provide maximum magnetic operating efficiency.

10 Claims, 10 Drawing Figures

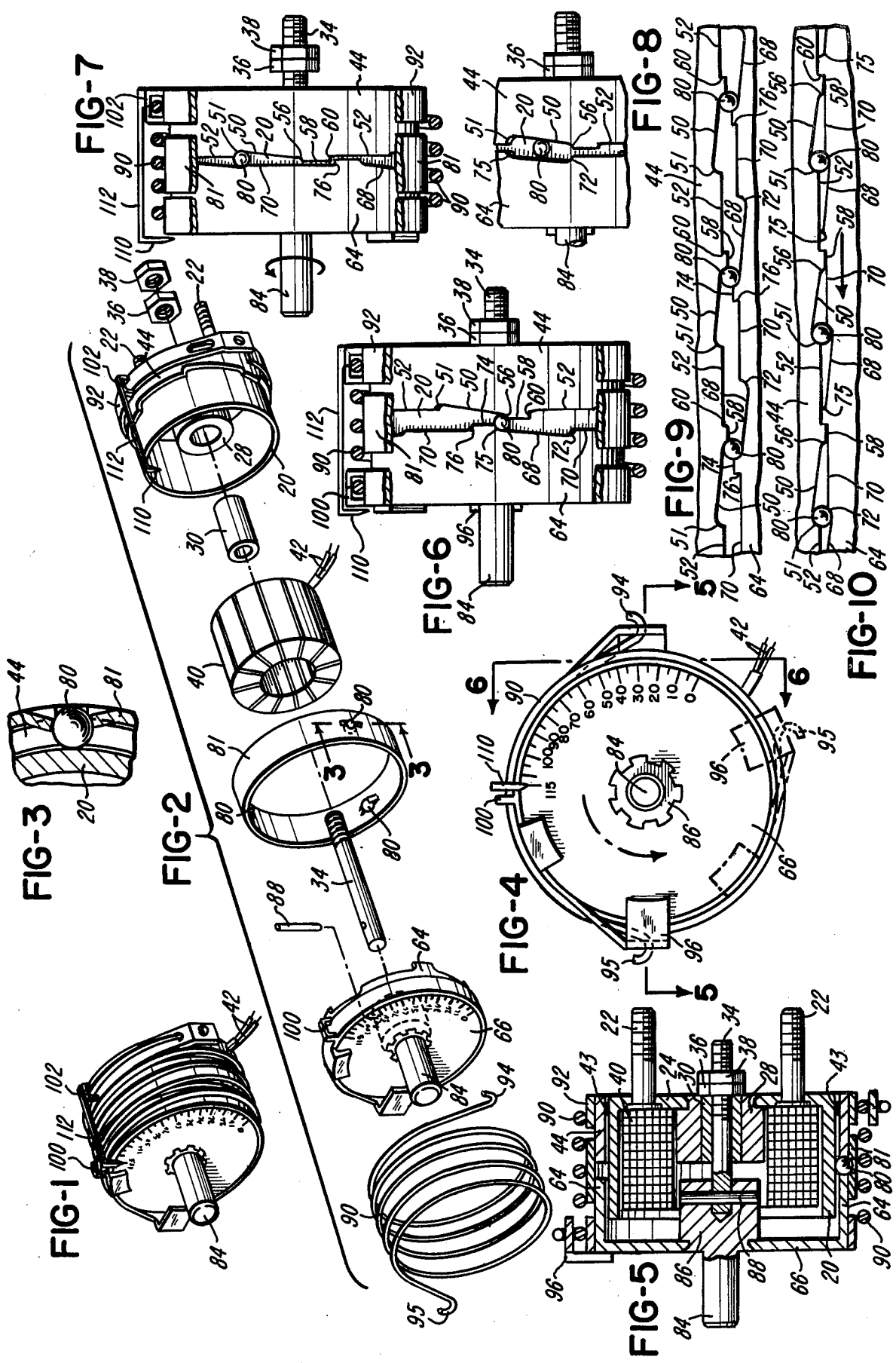

4,022,069

ROTARY ACTUATOR MECHANISM

RELATED APPLICATION

This application is a continuation of application Ser. No. 455,500, filed Mar. 27, 1974 now abandoned.

BACKGROUND OF THE INVENTION

Numerous electrically operated rotary actuator devices have been created. However, so far as is known, all of the prior art rotary actuator devices have, by necessity, been built for a predetermined degree of rotative or angular operation and have not been adjustable in degree of rotative angular movement. Therefore, in known prior art devices, a different rotary actuator device is required for each different desired angle of rotative operation.

Also, known rotary actuator devices have included magnetizable circuits which are relatively inefficient.

Known rotary actuator devices have employed involved means for attempting to maintain all movable elements in proper relative positions.

In known rotary actuator devices problems frequently occur in the mechanism when the deviceis electrically deenergized prior to completion of its cycle of operation or is mechanically prevented from completion of its cycle of operation.

Thus, an object of this invention is to provide rotary actuator mechanism in which all of the components thereof are maintained in a simple manner in proper relative positions, regardless of the degree of angular movement between members thereof.

Another object of this invention is to provide rotary actuator mechanism which can rotatively move through a maximum angle of operation and which can be adjusted to rotatively operate through any angle less than the maximum angle.

Another object of this invention is to provide electrically operable rotary actuator mechanism which has a very high degree of efficiency in the magnetizable circuit thereof.

Other objects and advantages of this invention reside in the construction of parts, the combination thereof, the method of production, and the mode of operation, as will become more apparent from the following decription.

BRIEF DESCRIPTION OF THE VIEWS OF THE DRAWING

FIG. 1 is a perspective view showing rotary actuator mechanism of this invention.

FIG. 2 is an exploded perspective view of the mechanism of FIG. 1.

FIG. 3 is an enlarged fragmentary sectional view taken substantially on line 3—3 of FIG. 2.

FIG. 4 is an enlarged end elevational view of the rotary actuator mechanism of FIGS. 1 and 2.

FIG. 5 is a sectional view taken substantially on line 5—5 of FIG. 4.

FIG. 6 is a sectional view taken substantially on line 6—6 of FIG. 4.

FIG. 7 is a sectional view similar to FIG. 6 but showing the mechanism in still another position of operation.

FIG. 8 is a fragmentary sectional view of a portion of the mechanism illustrated in FIGS. 6 and 7, but with the elements in another position of operation.

FIG. 9 is a layout type of view showing the ball members and the elements engaged thereby.

FIG. 10 is a layout type of view, similar to FIG. 9 but illustrating the elements shown therein in another position of operation.

DETAILED DESCRIPTION OF THE MECHANISM OF THE INVENTION

The rotary actuator mechanism of this invention comprises a magnetizable cup-shaped base member 20, which has mounting studs 22 extending from a wall 24 thereof. Secured to the wall 24 and positioned within the base member 20 is a tubular core 28. Within the tubular core 28 is any suitable bearing member, herein shown as being a sleeve bearing 30. Extending through the sleeve bearing 30 is a shaft 34, which is rotatably and axially movable within the sleeve bearing 30. The shaft 34 is of non-magnetizable material. Threadedly positioned upon the shaft 34, exterior of the base member 20, is an adjustment nut 36 and a jam nut 38.

Within the base member 20 and encompassing the tubular core 28 is a coil 40, having connection leads 42 extending therefrom. Encompassing the base member 20 integral therewith or secured thereto by suitable means such as welds 43 or the like, is an annular engagement member 44. The engagement member 44 has a plurality of substantially parallel inclined engagement surfaces 50. One end of each of the inclined engagement surfaces 50 is connected by an arcuate notch 51 to an edge surface 52. The other end of each of the inclined engagement surfaces 50 is connected by an arcuate notch 56 to an intermediate surface 58. Each intermediate surface 58 is also joined to the adjacent edge surface 52 by an offset 60.

Also encomapssing the base member 20 is an annular magnetizable engagement member 64 which has an end wall 66. The engagement member 64 has a plurality of inclined engagement surfaces 68, which are substantially parallel to the inclined engagement surfaces 50 of the engagement member 44. One end of each inclined engagement surface 68 is connected to an edge surface 70 by an arcuate notch 72. The other end of each of the inclined engagement surfaces 68 is connected to an intermediate edge surface 74 by an arcuate portion 75. Each intermediate edge surface 74 is also joined to the adjacent edge surface 70 by an offset 76.

A ball 80 is normally positioned between each inclined engagement surface 50 of the engagement member 44 and one of the inclined engagement surfaces 68 of the engagement member 64. The balls 80 are rotatively supported at the periphery of an annular carrier 81.

The end wall 66 of the engagement member 64 has an output shaft 84 secured thereto or integral therewith and extending therefrom. Also secured to the wall 66 or integral therewith and at least partially positioned within the annular coil 40 is a magnetizable plunger 86. The plunger 86 is coaxial with the shaft 34 and is joined thereto by any suitable means, such as by means of a pin 88 which extends through the plunger 86 and the shaft 34.

Encompassing the engagement members 44 and 64 is a coil spring 90 which has one end attached to the engagement member 44 by any suitable means, such as by means of an annular strip 92 which encompasses the engagement member 44 and which is attached thereto in any suitable manner. The coil spring 90 has an end portion 94 which is attached to the strip 92. The coil spring 90 has an opposite end 95 which is attached to a tab 96. Intermediate portions of the coil spring 90 extend through guide members 100 and 102.

As best shown in FIG. 4, the exterior surface of the wall 66 may, if desired, be provided with degree number indicia. A pointer 110 is carried by a stem 112 which is attached by any suitable means to the engagement member 44. The pointer 110 is positioned adjacent the degree number indicia on the exterior surface of the wall 66.

OPERATION

The mounting studs 22 are adapted to be secured to any suitable stationary structure for suppport of the rotary actuator mechanism of this invention. The shaft 84 is adapted to be attached to a suitable load for rotative or angular movement thereof.

When the coil 40 is electrically energized through the leads 42, such energization causes magnetization of the core 28, the plunger 86, the base member 20, the wall 24, the engagement member 44, the engagement member 64 and the wall 66. Thus, such magnetization causes movement of the plunger 86 toward the core 28 and movement of the engagement member 64 toward the engagement member 44. However, such movement of the engagement member 64 toward the engagement member 44 results in rotative movement of the engagement member 64 with respect to the engagement member 44, due to the fact that the inclined engagement surfaces 68 and 50 with the balls 80 therebetween permit axial movement of the engagement member 64 with respect to the engagement member 44 only if rotative movement therebetween also occurs.

Thus, upon energization of the coil 40, the engagement member 64 rotatively moves in a counter-clockwise direction, as illustrated in FIGS. 4 and 7. When such rotative movement occurs, the balls 80 rotatively move upon the inclined engagement surfaces 50 and 68. FIGS. 5, 6, and 9 show the engagement member 64 in a deactuated position. In the de-energized position the nut 36 is in engagement with the core 28, as shown in FIG. 5. When energization of the coil 40 occurs, the engagement member 64 begins to rotatively move counter-clockwise from the position thereof shown in FIG. 6, to the position thereof shown in FIG. 7.

As this rotative movement of the engagement member 64 occurs, each of the balls 80 rotatively moves the arcuate notches 56 and 75 toward the arcuate notches 51 and 72. Thus, each ball 80 moves along an inclined engagement surface 50 of the engagement member 44 and along an inclined engagement surface 68 of the engagement member 64. Thus, there is relative rotative movement between the engagement member 44 and the engagement member 64.

FIG. 8 illustrates an intermediate rotative position of the engagement member 64 and one of the balls 80.

For maximum rotative movement, the engagement member 64 rotatively moves until each ball 80 is positioned within an arcuate notch 72 of the engagement member 64 and an arcuate notch 51 of the engagement member 44, as shown in FIG. 7.

At this rotative position of the engagement member 64, the 0° indicia shown in FIG. 4 on the outer surface of the wall 66 is in position directly below the pointer 110. Also in this position of the engagement member 64, the shaft 34 has moved axially and rotatively within the bearing 30, so that the nut 36 is spaced a maximum distance from the core 28, as illustrated in FIG. 7.

With such rotative movement of the engagement member 64, the output shaft 84 also rotatively moves. Thus, a work element attached to the output shaft 84 is rotatively moved through the same angle as in the engagement member 64. Such rotative movement of the engagement member 64 is against the forces of the coil spring 90. Thus, when the electrical coil 40 is de-energized, the coil spring 90 causes the engagement member 64 to rotatively move in a clockwise direction until the nut 36 again engages the core 28, as shown in FIG. 5. It is to be understood, however, that any suitable means, other than the coil spring 90, may be employed for return movement of the engagement member 64.

If it is desired to limit the rotative movement of the engagement member 64 and thus limit the rotative movement of the output shaft 84, the nut 36 is threadedly moved upon the shaft 34 so that when the engagement member 64 is in its deactivated position, the degree indicia below the pointer 110 is less than the maximum degree. Such position of the engagement member 64 may be substantially as shown in FIG. 8. In such position, each of the balls 80 is located in an intermediate position.

After the nut 36 is threadedly moved to its desired adjusted position to establish the operative angle of rotative movement of the engagement member 64, the jam nut 38 is threadedly moved into engagement with the nut 36 to lock the nut 36 in position upon the shaft 34.

Thus, it is understood that rotary actuator mechanism of this invention is operable through a large angle. The maximum angle may be at least 115° or 120° degrees. Furthermore, the rotary actuator mechanism of this invention may be adjusted to rotatively operate a load to any desired degree less than the maximum. Thus, one actuator device of this invention can be employed for operation of any one of numerous types of rotary loads.

Due to the fact that the balls 80 are secured in relative positions and rotatively carried by the annular carrier 81, the relative positions of the balls 80 cannot change. Thus, the angular movement between the engagement members 64 and 44 can be stopped an any desired position without interference with the proper relative positions of the balls 80 and the other elements of the rotary actuator mechanism of this invention. Thus, the desired angle of rotative movement can be adjusted. Also, if for any reason the movable engagement member should be prevented from movement to its fully adjusted angle of movement, no trouble is involved within the actuator mechanism.

Due to the fact that magnetic airgap formations within the mechanism of this invention are a minimum in length, very high magnetic efficiencies are possible in the rotary actuator mechanism of this invention.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. In a rotary actuator device including a base member having a projecting core, an actuator member having a projecting core positioned in opposing spaced relation to said core of said base member, a shaft connected to said actuator member and extending through a bore within said base member, said actuator member being supported for both rotary and axial movement relative to said base member and said shaft being connected to move axially with said actuator member, means on said base member forming a plurality of angularly arranged and axially facing inclined surfaces, means on said actuator member forming a corresponding plurality of angularly arranged and axially facing inclined surfaces disposed in opposing relation to said inclined surfaces on said base member, a corresponding plurality of roller members disposed between said opposing inclined surfaces, an electrical coil surrounding said cores and effective to move said actuator member in an axial direction towards said core of said base member in response to energizing of said coil, the opposing said inclined surfaces and said roller members being effective to rotate said actuator member in one direction when said coil is energized and said actuator member moves axially, and means for rotating said actuator member in the opposite direction when said coil is deenergized, the improvement comprising means associated with said shaft adjacent said base member for adjustably limiting the axial movement of said shaft and said actuator member for precisely adjusting the angle of rotation of said actuator member is said one direction.

2. A rotary actuator device comprising of first cup-shaped magnetizable shell member having an annular wall and an end wall, the annular wall of the first shell member having a plurality of peripherally spaced inclined surfaces, a first magnetizable core member secured to the end wall of the first shell member at the central portion thereof and being surrounded by the annular wall of the first shell member, a second cup-shaped magnetizable shell member having an annular wall and an end wall, the annular wall of the second shell member extending closely adjacent a portion of the annular wall of the first shell member, the annular wall of the second shell member having a plurality of peripherally spaced inclined surfaces facing the inclined surfaces of the annular wall of the first shell member, a second magnetizable core member secured to the end wall of the second shell member at the central portion thereof and surrounded by the annular wall of the second shell member, the second core member being in axial alignment with the first core member, a plurality of roller members disposed between the inclined surfaces of the first shell member and the inclined surfaces of the second shell member, an annular retainer member extending around said inclined surfaces and joining the roller members together in fixed spaced-apart relation, an electrically energizable coil surrounding at least one of the core members and effective to magnetize the shell members and the core members in response to energizing of the coil to produce axial movement of the second shell member toward the first shell member, the inclined surfaces and the roller members causing rotation of the second shell member in one direction in response to axial movement of the second shell member, the means for rotating the second shell member in the opposite direction when the coil is deenergized.

3. A rotary actuator device as defined in claim 1 wherein said shaft includes an end portion projecting from said base member and having threads thereon, and said means for adjustably limiting the axial movement of said shaft and said actuator member includes an adjustable stop member engaging said threads.

4. A rotary actuator device as claim 3 wherein said adjustable stop member comprises a nut, and means for locking said nut in a selected adjusted position.

5. A rotary actuator as defined in claim 2 wherein said annular retainer member comprises a generally cylindrical band surrounding said annular walls of said first and second shell members, and said band defines a plurality of circumferential cavities for receiving said roller members.

6. A rotary actuator as defined in claim 2 including a shaft connected to said second core member and extending axially through a bore within said first core member, and means associated with said shaft adjacent said first core member for adjustably limiting the axial movement of said shaft and said second shell member for precisely adjusting the angle of rotation of said second shell member.

7. Rotary actuator mechanism of the type provided with a magnetizable cup-shaped base member having an annular wall and an end wall, the base member having an annular engagement portion provided with an inclined engagement surface, a magnetizable core member attached to the end wall and positioned within the base member, an electrically energizable coil within the base member and encompassing the core, a magnetizable rotatably and axially movable actuator member having an annular engagement portion in alignment with the annular engagement portion of the base member, the engagement portion of the actuator member having an inclined engagement surface, the movable actuator member including a magnetizable plunger portion which is adjacent and in substantial axial alignment with the magnetizable core, means for joining the movable actuator member to a load for rotative movement of the load with rotative movement of the actuator member, a plurality of spaced-apart ball members positioned between the inclined engagement surface of the movable actuator member and the inclined engagement surface of the base member, the improvement comprising carrier means encompassing the annular engagement portions of the base member and the actuator member and rotatively supporting the ball means and maintaining the position thereof with respect to the carrier means, energization of the electrically energizable coil thus causing magnetization of the magnetizable core and the magnetizable base member and the magnetizable actuator member including the magnetizable plunger, the actuator member thus moving axially and rotatively toward the base member when the coil is energized so that a load joined to the actuator member is rotatively moved.

8. A rotary actuator device comprising:
   a magnetizable cup-shaped base member having an annular wall and an end wall.
   a magnetizable core member within the base member and attached to the end wall,
   an electrically energizable annular coil within the base member and encompassing the core,
   a rotatable and axially movable shaft extending through the core,
   abutment means carried by the shaft and engageable with the core to limit axial movement of the shaft, a base member having an annular engagement portion provided with an inclined engagement surface, a magnetizable rotatably and axially movable actuator member having an annular engagement portion in alignment with the annular engagement portion of the base member, the engagement portion of the actuator member having an inclined engagement surface, the movable actuator member including a magnetizable plunger portion which is encompassed by the coil and which is adjacent and in substantial axial alignment with the magnetizable core, means joining the plunger to the shaft which extends through the core, for movement of the shaft with movement of the plunger, connection means for joining the movable actuator member to a load for rotative movement thereof, a plurality of ball members positioned between the inclined engagement surface of the movable actuator member and the inclined engagement surface of the base member, carrier means rotatably supporting the ball members and maintaining the position thereof with respect to the carrier means, the carrier means encompassing the annular engagement portions of the actuator member and the base member, energization of the electrically energizable coil thus causing magnetization of the magnetizable core and the magnetizable base member and the magnetizable actuator member including the magnetizable plunger, the actuator member thus moving axially and rotatively toward the base member when the coil is energized so that a load joined to the actuator member is rotatively moved in a given rotative direction when the coil is energized, means for axially and rotatively moving the actuator member in a direction away from the base member.

9. Rotary actuator mechanism of the type having a pair of magnetizable members, each of the magnetizable members having an annular engagement portion provided with a plurality of inclined engagement surfaces, a plurality of ball members, there being a ball member positioned between an inclined engagement surface on one of the magnetizable members and an inclined engagement surface of the other magnetizable member, an electrically energizable annular coil member carried by one of the magnetizable members, each of the magnetizable members having a portion within the annular coil member, the magnetizable members being axially and rotatably relatively movable, the improvement comprising: and annular retainer member encompassing the annular engagement portions of the magnetizable members and rotatably supporting the ball members in fixed spaced-apart relationship, means limiting relative axial movement between the magnetizable members, energization of the annular coil member causing magnetization of the magnetizable members and causing relative axial movement therebetween, such axial movement causing relative rotative movement as the ball members engage the inclined engagement surfaces of the magnetizable members.

10. Rotary actuator mechanism comprising:

a pair of magnetizable shell members, each of the shell members having an annular wall portion and a transverse wall portion, the shell members being arranged in opposed substantially coaxial relationship with the annular wall portions being in substantially aligned adjacent relationship, each of the annular wall portions having a plurality of inclined engagement surfaces, the inclined engagement surfaces of the annular wall portion of one shell member being generally in facing relationship to the inclined engagement surfaces of the annular portion of the other shell member, one of the shell members having an annular part slidably positioned within the annular wall portion of the other shell member, a plurality of roller members, there being one roller member engaging an inclined engagement surface of one shell member and an inclined engagement surface of the other shell member, a movable retainer member encompassing the annular wall portions of the shell members and joining the roller members together in fixed spaced-apart relationship, a pair of substantially coaxial magnetizable protuberance, the magnetizable protuberances being in adjacent facing relationship, there being a magnetizable protuberance carried by the transverse wall portion of each shell member, each magnetizable protuberance being directly joined to its respective shell member and encompassed by the annular portion thereof, an electrically energizable coil encompassing the magnetizable protuberance of each of the the shell members and encompassed by the annular portion thereof, energization of the electrically energizable coil causing magnetization of the shell members and the protuberances thereof and causing relative axial movement of the shell members one toward the other, the inclined surfaces and the roller members causing relative rotative movement of the shell members as relative axial movement thereof occurs.

* * * * *

UNITED STATES PATENT AND TRADEMARK OFFICE
CERTIFICATE OF CORRECTION

PATENT NO. : 4,022,069
DATED : May 10, 1977
INVENTOR(S) : Raymond W. Boyer

It is certified that error appears in the above-identified patent and that said Letters Patent are hereby corrected as shown below:

Column 2, line 35, change "encomapssing" to ---encompassing---.

Column 5, line 30, change "is" to ---in---.

Column 5, line 32, change "of" to ---a---.

Column 7, line 1, change "a" to ---the---.

Column 8, line 35, change "ance" to ---ances---.

Signed and Sealed this nineteenth Day of July 1977

[SEAL]

Attest:

RUTH C. MASON
Attesting Officer

C. MARSHALL DANN
Commissioner of Patents and Trademarks